United States Patent [19]

Barton et al.

[11] 4,440,017
[45] Apr. 3, 1984

[54] HYDROGEN LEAK MONITOR FOR A TURBINE-GENERATOR

[75] Inventors: Sterling C. Barton; Joseph E. Pitoniak, both of Scotia, N.Y.

[73] Assignee: General Electric Company, Schenectady, N.Y.

[21] Appl. No.: 346,805

[22] Filed: Feb. 8, 1982

[51] Int. Cl.³ .......................................... G01M 3/30
[52] U.S. Cl. .................................. 73/40.5 R; 310/53; 340/605
[58] Field of Search ............... 73/40.5 R, 40; 310/53; 340/605

[56] References Cited

U.S. PATENT DOCUMENTS

| 2,675,493 | 4/1954 | Grobel | 310/53 |
| 3,122,668 | 2/1964 | Cuny | 310/53 |
| 3,822,389 | 7/1974 | Kudlacik | 310/53 |
| 4,008,755 | 2/1977 | Vandamme | 310/53 X |
| 4,300,066 | 11/1981 | Butler | 310/53 |

FOREIGN PATENT DOCUMENTS 162380   8/1974   Hungary ............................... 310/53

OTHER PUBLICATIONS

Csillag–"Venting and Leak Monitoring Apparatus for Water–Cooled System of Turbogenerator Stator Windings", IEEE (1978).

Primary Examiner—Gerald Goldberg
Assistant Examiner—Joseph W. Roskos
Attorney, Agent, or Firm—John F. Ahern; Robert C. Kain, Jr.

[57] ABSTRACT

A device for monitoring the leakage of cooling gas for a turbogenerator stator into the stator water-cooling system is disclosed. The device is located next to the generator so that the operative elements are at the generator storage tank operating water level. As cooling accumulates in the storage tank together with cooling water, the gas displaces the water in the leak monitor until the water level rises to a predetermined, adjustable level. When this level is reached, the gas is vented and the water level is restored to equilibrium. Each cycle is recorded on a leak trip counter. When the leakage rate exceeds a predetermined value, an alarm is triggered.

9 Claims, 2 Drawing Figures

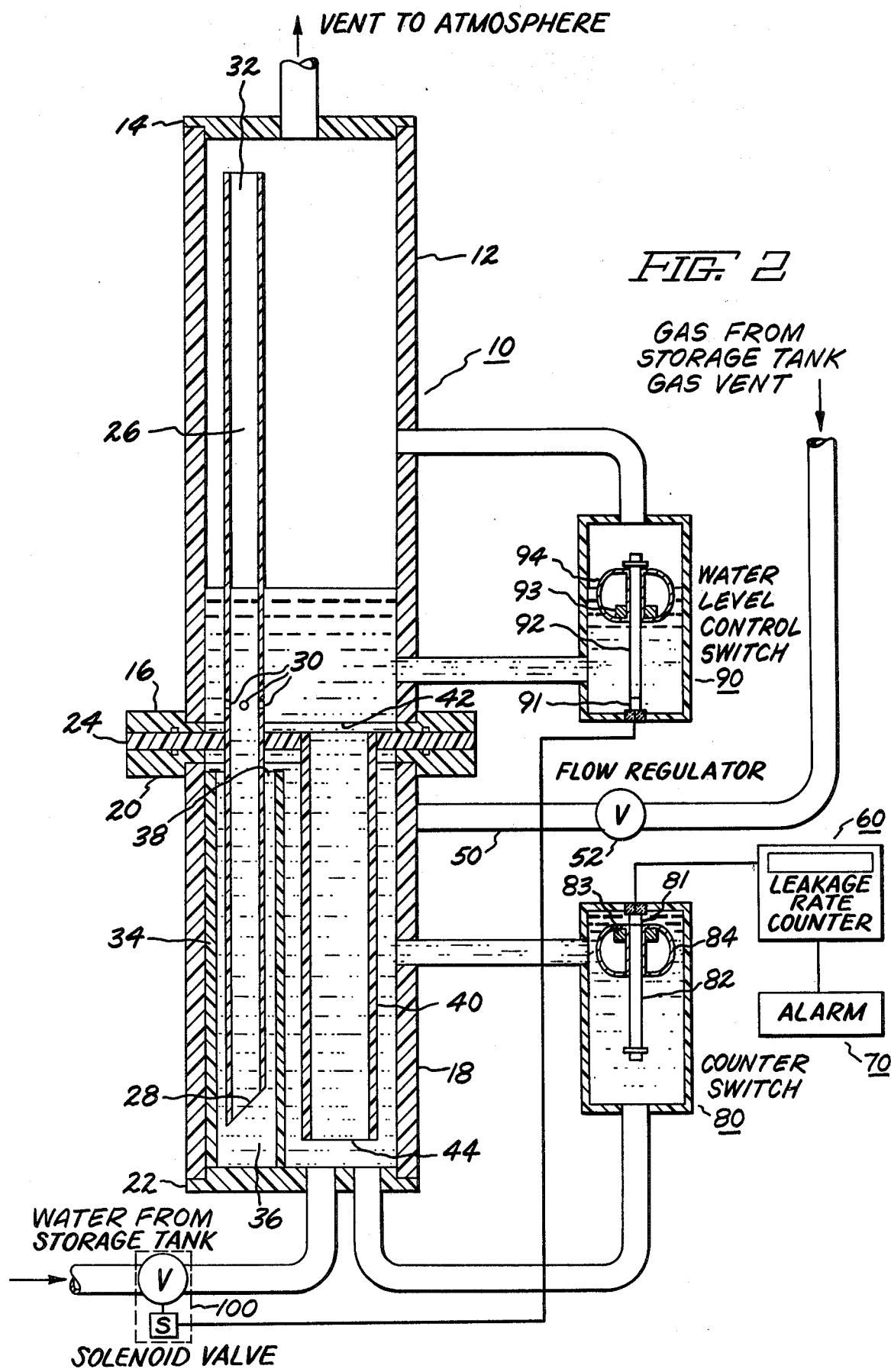

HYDROGEN LEAK MONITOR FOR A TURBINE-GENERATOR

BACKGROUND OF THE INVENTION

1. Field of the Invention

This invention relates to a turbogenerator machine and more particularly to an improved device for detecting gas leakages which may occur in the cooling system of the machine.

2. Description of the Prior Art

Dynamoelectric machines used in the production of electrical power are typically cooled by a dual cooling system, as for example described by Y. S. Hargett, in a publication entitled, "Large Steam Turbine-Driven Generator", General Electric Company, Schenectady, N.Y., 1980. For many years, all of the larger turbine-generators have been designed to operate in a gas cooling system, e.g., hydrogen atmosphere, which is maintained in the gas-tight casing of the generator. The stator windings are also separately cooled through a liquid cooling system by flowing a liquid, preferably water, through the individual strands of the stator bars.

Conventionally, the gas within the casing of the machine is maintained at a higher pressure than the pressure of the water used to cool the stator windings. The pressure differential between the gas cooling system and the liquid cooling system makes it possible to detect leakage between them. Thus, should a leak occur, the gas is forced to enter the liquid cooling system from which samples may be withdrawn and analyzed. When such leakages become excessive, corrective action must be taken to avoid serious operating problems. It is therefore desirable to use a gas monitor and warning system to detect leakage of of the gas into the liquid cooling system.

An apparatus was described in Hungarian Patent No. 162,380 and in paper A78307-1 by I. K. Csillag, IEEE, PES Winter Meeting, January 1978, for automatically venting the water-cooled system of turbogenerator stator windings, continuously monitoring its gas tightness and providing a warning signal at a predetermined rate of gas penetration. The apparatus separates the unabsorbed gas from the liquid traversing it, and continuously measures the volume of the separated gas. After the accumulation of a predetermined volume of gas, the monitoring device automatically vents it. The number of ventings is recorded and a warning signal is provided at a predetermined rate of gas separation.

In the water-cooling system incorporating the Csillag apparatus, the gas bubbles are collected from the cooling water flow in a gas separator and continuously introduced with a portion of the cooling water into the apparatus. The gas is retained, while the cooling water portion flows further into an expansion chamber and from there continues into the main system of cooling water. The device also uses a specially designed U-tube which opens below the water level to vent the gas. Unfortunately this causes turbulence in the water and in high leakage situations may result in an obstructed gas path which may cause the device to stall.

Objects of the Invention

It is therefore an object of the present invention to provide an improved device for monitoring leakages of cooling gas into the water-cooling system of a turbine-generator.

It is a further object of this invention to provide an improved device for continuously monitoring gas coolant leakages into the liquid cooling system which is designed to correct the operating deficiencies of the prior art.

SUMMARY OF THE INVENTION

In accordance with the present invention, we have discovered a device for monitoring the leakage of cooling gas into the stator water-cooling system of a turbogenerator. The device has two chambers which includes an upper chamber vented to the atmosphere and a lower chamber connected to a storage tank. The upper and lower chambers are separated by a seal between them. The two chambers are interconnected by a first tube having an open upper end and an open lower end, and extends toward the bottom of the lower chamber and toward the top of the upper chamber through the seal. A second tube which has a greater diameter than the diameter of the first tube, surrounds the first tube in the lower chamber. The second tube has an upper open end and is connected in fluid-sealing relationship at its lower end to the base of the lower chamber. A third tube which is open at both ends extends from near to the bottom of the lower chamber through the seal into the bottom of the upper chamber. The lower open end of the first tube is higher than the lower open end of the third tube. Normally, the lower chamber and a portion of the upper chamber are filled with water. The top of the first tube is above the water level therein, while the top of the third tube is below the water level therein. As gas escapes and collects in the storage tank it is also fed into the lower chamber of the leak monitor. The gas pressure in the lower chamber of the leak monitor forces water to be displaced therefrom and into the upper chamber through the first and third tubes. When gas-water interface in the lower chamber reaches a predetermined level, gas flows from the lower chamber to the upper chamber through the first tube and the cycle returns to its beginning point. Each cycle is recorded on a collector. When the collector counts to a predetermined number within a predetermined period of time an alarm is triggered.

DESCRIPTION OF THE DRAWING

This invention will be better understood when taken in connection with the following description and drawing, in which:

FIG. 2 a cross-sectional view of the leak monitor of this invention.

DETAILED DESCRIPTION OF THE DRAWING

Figure 1:
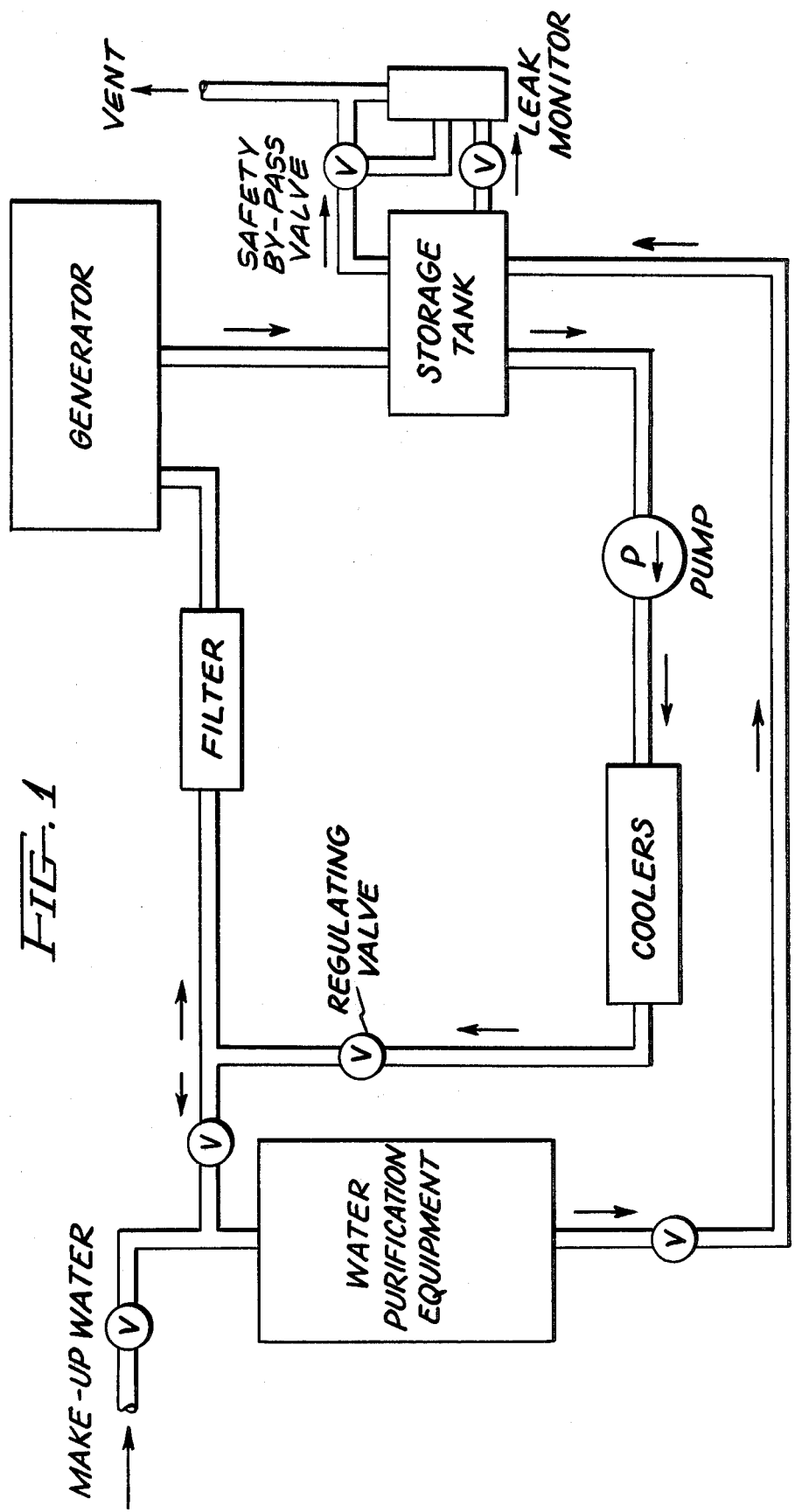
FIG. 1 is a schematic diagram of an external system for water-cooled stator winding to which a gas leak monitor is connected.

FIG. 1 outlines a simplified schematic diagram of the external liquid system for a water-cooled generator stator winding. The water circulation path including the water purification equipment filter, storage tank, pump and coolers are shown. In the design of such a generator stator winding system, the water storage tank is located below the generator. Essentially all the detrainment of gas from the water takes place in the storage tank and the effectiveness is improved by the use of a debubbler. For this reason the leak monitor can be connected into the storage tank vent line at any convenient location. Since, however, the gas leakage rate is determined by the repetitive displacement of water in the leak monitor, it is necessary that an adequate amount of water be maintained in the monitor at all times. This can be accomplished by locating the monitor along the side of the storage tank, and using the water level in the storage tank therefor. Any water lost by evaporation or otherwise can thus be replaced automatically.

As illustrated in FIG. 2, gas leak monitor 10 is divided into two chambers, namely upper chamber 12 having upper end 14 and lower end 16, and lower chamber 18 also having upper end 20 and lower end 22. Together with center disk 24, lower end 16 of upper chamber 12 and upper end 20 of lower chamber 18 are affixed and sealed to each other. A plurality of tubular members connect upper chamber 12 to lower chamber 18. First tubular member or gas relief tube 26 has a bottom end 28 disposed in lower chamber 18 and extends into upper chamber 12 upwardly through upper end 20 of lower chamber 18, center disk 24 and lower end 16 of upper chamber 12. The lower end 28 of gas relief tube 26 is preferably beveled to about a 45 degree angle for the purpose of providing a more precise trip setting of the gas from lower chamber 18. The length of the gas relief tube 26 can be varied to increase or decrease the quantity of gas displaced. Upper end 32 of gas relief tube 26 extends toward the upper end 14 of upper chamber 12.

Second tubular member or stand pipe 34 is disposed in lower chamber 18 and has a greater diameter than the diameter of gas relief tube 26. One end 36 of stand pipe 34 is affixed to the bottom portion 22 of lower chamber 18. The other end 38 of stand pipe 34 is open to lower chamber 18. Stand pipe 34 is spaced from and encompasses a substantial portion of the gas relief tube 26 in lower chamber 18.

Third tubular member or water return tube 40 is open on both ends, and the upper open end 42 extends into lower end 16 of upper chamber 12, and lower open end 44 of water return tube 40 extends toward the lower end 22 of lower chamber 18. End 44 of return tube 40 is closer to lower end 22 than lower end 28 of gas relief tube 26.

The gas relief tube 26 has a plurality of bleed holes 30 which are located at the same level under the water line in upper chamber 12, preferably near lower end 16. As gas accumulates in lower chamber 18, water in gas relief tube 26 is permitted to pass through bleed holes 30 into upper chamber 12, thereby equalizing the water level in the upper portion of gas relief tube 26 and in upper chamber 12. As gas continues to accumulate it fills lower chamber 18, including stand pipe 34, causing the water to flow through tubes 26 and 40 and therefore to rise in the upper chamber 12. A point is finally reached at which all the water in the stand pipe 34 from the top 38 to the lower end 28 of gas relief tube 26 is removed and the gas relief tube 26 is open to the gas. Since the gas now has an unobstructed path from lower chamber 18 to upper chamber 12, the gas pressure is relieved. Water can now return from the upper chamber 12 through water return tube 40 while the gas still remaining in the lower chamber 18 continues to flow through the gas relief tube 26 into upper chamber 12 until the water level in the lower chamber 18 reaches the top 38 of the stand pipe 34. Water then entering stand pipe 34 seals the bottom opening of the gas relief tube 26 and the gas flow into the upper chamber 12 stops. During this time water does not enter gas relief tube 26 through bleed holes 30 until gas relief tube 26 is sealed and gas flow has stopped.

In operation, should cooling gas leak into the cooling water, it accumulates in a storage tank and builds up pressure. Then the cooling gas enters a lower chamber 18 of the monitor 10 through a gas vent inlet tube 50 causing pressure to increase in the lower chamber 18. Flow regulator 52 is inserted between the storage tank vent and the gas vent inlet tube 50 to control the gas flow rate and to prevent it from exceeding the capacity of the monitor. The increased pressure forces water in the lower chamber 18 to rise into an upper chamber 12 through gas relief tube 26 and water return tube 40 between the two chambers. The gas replaces water in the gas relief tube 26 until all the water is removed therefrom. For an extremely short period of time, the gas is permitted to flow unimpeded through gas relief tube 26 such that the gas pressure in the lower chamber 18 is relieved. Now the water in the upper chamber 12 flows downward through the water return tube 40 replacing the relieved gas and then the cycle is repeated. Each cycle is recorded by a leakage rate counter 60 connected to counter switch assembly 80, including a magnetic switch 81, contained within post 82, the operation of which is caused by linkage with magnet 83, contained in float 84 which moves vertically along post 82. When leakage exceeds a predetermined value, the water level in switch assembly 80 rises and float 84 rises so that magnet 83 couples with magnetic switch 81, which is actuated, and a pulse is recorded by counter 60. When a predetermined number of pulses is exceeded, within a predetermined period of time, alarm 70 is triggered. The water level in the gas leak monitor 10 is automatically adjusted by water level control switch assembly 90 containing a float 94 vertically movable on post 92 and containing a magnet 93 which actuates magnetic switch 91 which in turn activates solenoid valve 100 which permits admission of water from the storage tank to maintain a proper water level in the monitor.

A pressure-relief valve (FIG. 1) is connected across monitor between the storage tank and the vent in case the monitor becomes blocked, thus allowing for emergency venting.

It will be appreciated that the invention is not limited to the specific details shown in the illustrations and that various modifications may be made within the ordinary skill in the art without departing from the spirit and scope of the invention.

What is claimed is:

1. In a dynamoelectric machine, a device for monitoring the leakage of cooling gas into the stator water cooling system, wherein said cooling gas accumulates in a water storage tank of said system, said device comprising: an upper chamber having opposed upper and lower ends;

a lower chamber having opposed upper and lower ends;

the lower end of the upper chamber being affixed to the upper end of the lower chamber and sealed thereto;

a first tubular member having opposed open ends, disposed in the lower chamber and extending upwardly through said seal between said upper and lower chambers and into said upper chamber;

a second tubular member disposed in said lower chamber and having a greater diameter than said first tubular member, one end thereof being affixed to the lower end of said lower chamber and the other end being open to the lower chamber, said second tubular member being spaced from and encompassing a substantial portion of said first tubular member in said lower chamber;

a third tubular member having opposed open ends, the upward open end disposed in the lower chamber and extending upwardly therefrom through said seal and opening into said upper chamber;

the lower end of said third tubular member being open and disposed closer to the lower end of said lower chamber than the lower end of said first tubular member;

the upper end of said first tubular member being disposed further from the lower end of the upper chamber than the upper end of said third tubular member;

a water level control means connected to the upper chamber for maintaining, under normal operating conditions, a volume of water sufficient to cover the upper end of said third tubular member and insufficient to cover the open end of said first tubular member; and means for introducing the accumulated cooling gas from said storage tank into the lower chamber near the upper end thereof; and means for venting the gas from the upper chamber.

2. The device of claim 1, wherein the lower open end of said first tube has a beveled shape.

3. The device of claim 2, wherein the first tube additionally contains bleed holes opening into said upper chamber above said seal.

4. The device of claim 1, wherein the upward open end of said third tube is below the upper open end of said first tube.

5. The device of claim 4, wherein the upper open end of said third tube extends up through said seal.

6. The device of claim 1, including a first switch actuated means for automatically counting the number of times the lower chamber is filled with gas.

7. The device of claim 6, including an alarm means activated by a predetermined excessive leakage of cooling gas.

8. The device of claim 6, including a second switch actuated means for automatically maintaining the water level of said device.

9. The device of claim 1, wherein the means for introducing the accumulated cooling gas from the storage tank includes a flow regulator to control the gas flow rate.

* * * * *